(12) United States Patent
Koltz

(10) Patent No.: US 6,206,174 B1
(45) Date of Patent: Mar. 27, 2001

(54) PRESSURELESS MULTI-LANE DIVIDING APPARATUS

(75) Inventor: Frank Koltz, Ville Saint-Laurent (CA)

(73) Assignee: VCS Control Systems, Inc., Quebec (CA)

( * ) Notice: Subject to any disclaimer, the term of this patent is extended or adjusted under 35 U.S.C. 154(b) by 0 days.

(21) Appl. No.: 09/284,903

(22) PCT Filed: Sep. 2, 1997

(86) PCT No.: PCT/CA97/00622

§ 371 Date: Jun. 7, 1999

§ 102(e) Date: Jun. 7, 1999

(87) PCT Pub. No.: WO98/17556

PCT Pub. Date: Apr. 30, 1998

(30) Foreign Application Priority Data

Oct. 24, 1996 (CA) .................................................. 2188735

(51) Int. Cl.[7] .................................................. B65G 47/00
(52) U.S. Cl. .......................... 198/444; 198/445; 198/452
(58) Field of Search .................................... 198/436, 437, 198/442, 443, 444, 445, 447, 448, 452; 209/539, 922

(56) References Cited

U.S. PATENT DOCUMENTS

| | | | | |
|---|---|---|---|---|
| 3,310,151 | * | 3/1967 | Carter | 198/444 |
| 4,054,199 | * | 10/1977 | Polderman | 198/452 |
| 4,496,040 | * | 1/1985 | Kronseder et al. | 198/436 X |
| 4,889,225 | * | 12/1989 | van Uitert | 198/444 |

FOREIGN PATENT DOCUMENTS

2199296 * 7/1988 (GB) ..................................... 198/445

* cited by examiner

Primary Examiner—Tuan N. Nguyen

(57) ABSTRACT

An apparatus for the pressureless division of a flow of objects from a conveyor system into multiple paths. The apparatus is ideally suited for use in conveying and combining streams of bottles. The apparatus generally is connected to a feed conveyor carrying a bulk flow of articles. The apparatus may include a conveyor system which permits the division of a bulk flow of bottles into discrete delivery channels. The apparatus may also include detectors to monitor and allow adjustment of the flow of bottles in each delivery channel.

20 Claims, 5 Drawing Sheets

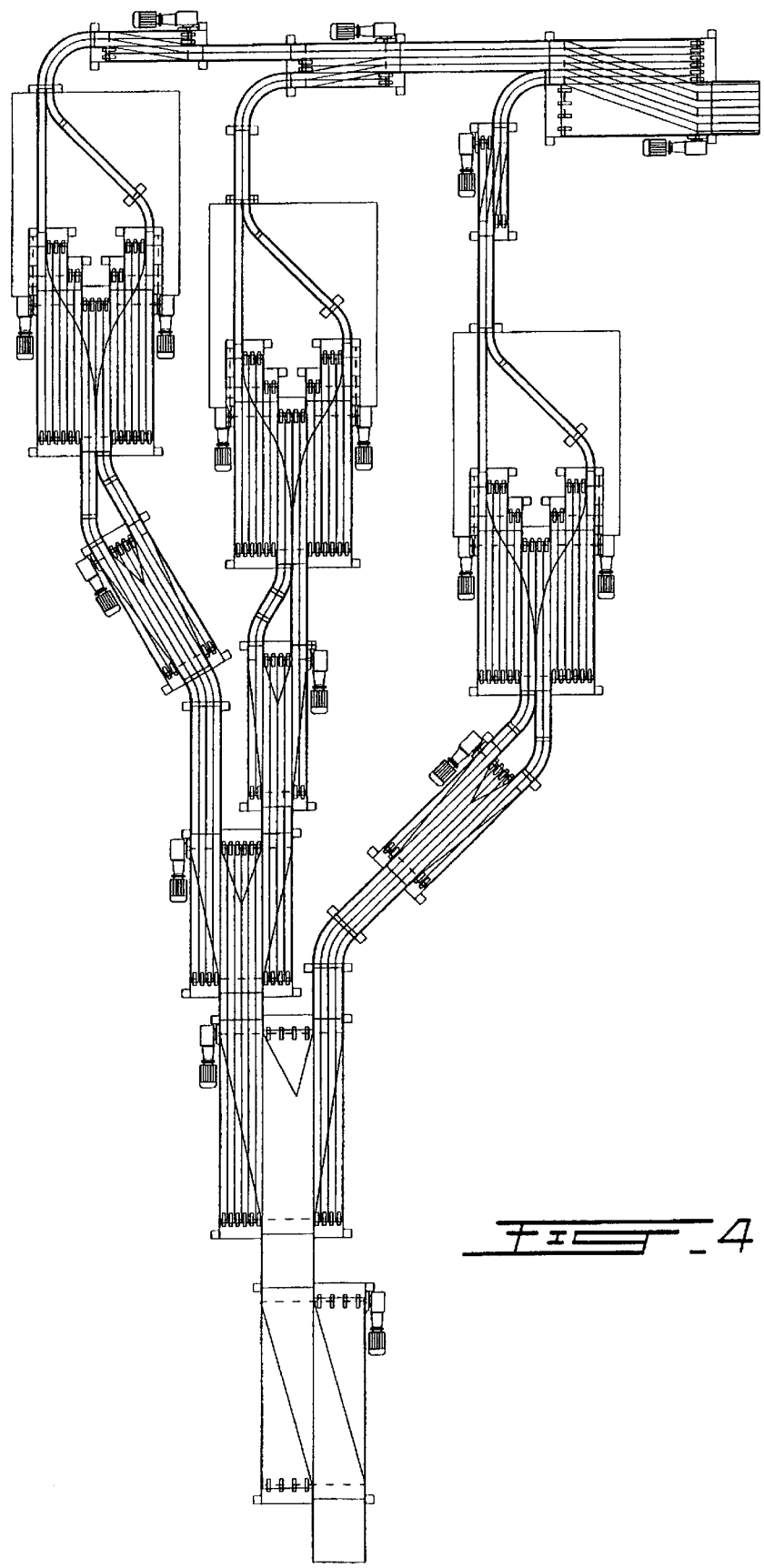
FIG_4 (PRIOR ART)

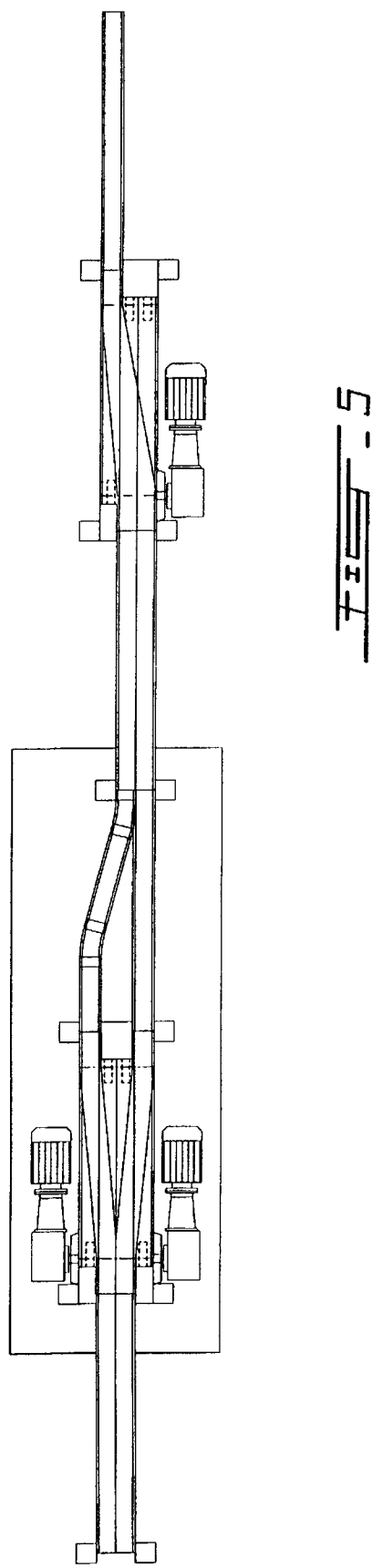

PRESSURELESS MULTI-LANE DIVIDING APPARATUS

BACKGROUND OF THE INVENTION

1. Field of the Invention

This invention relates to conveying apparatus concerned with combining conveyed products, such as bottles, into multiple discrete product paths.

2. Description of the Prior Art

In the prior art, numerous conveyor systems have been developed to separate a mass of articles into discrete delivery paths leading to labelling, filling or other packaging devices. To this end, it is known to use deflectors, guides and separators placed in the stream of articles being conveyed so as to achieve a single aligned stream. However, those conveyor systems promote frictional contact between the products being conveyed and result in surface wear of the products, noise and a propensity to jam and damage the products being conveyed.

It is also known to use what are commonly called "pressureless" conveyors systems such as described in U.S. Pat. No. 4,974,720. Those conveyor systems generally comprise a feed conveyor on which a mass of articles, such as bottles, are disposed at random and advance forward. The feed conveyor leads to an intermediate multi-track conveyor. Each track is driven at a different speed according to a speed gradient. This accelerates the bottles on the side of the conveyor having the fastest track. This promotes separation of the bottles and gradual flow alignment. Moreover, the intermediate conveyor is equipped with a curved guide plate channelling the bottles to a single file output. Once in a single file, the bottles transfer onto a delivery conveyor and exit the pressureless conveyor. However, such systems are designed for single file output and must be installed in parallel in order to provide multiple aligned feed lines as required by most packaging machines. Installing many such machines in parallel consumes valuable factory floor space, adds to cost, noise pollution and requires additional maintenance.

Thus, the present invention addresses the need for a machine that can combine a mass flow of product into two or more discrete output paths with automatic control of the flow of each output path. Moreover, the present invention also addresses the need for a machine which can be operated to selectively switch from two or more discrete output paths to a single file output path. As an added benefit, the present invention also addresses the need for a machine that can separate a single file product input trail into two or more discrete output paths with automatic control of the flow of each output paths.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

SUMMARY OF THE INVENTION

The present invention relates to a multilane combiner for combining a mass input flow or alternatively a single file input flow into two or more distinct and controlled output flows. The apparatus of the invention is designed for installation in a conveyor line of the type used to feed a machine requiring the orderly and sequential input of articles. The apparatus of the invention is used for the division of a flow of objects travelling on said conveyor line into multiple output paths, said apparatus comprising:

(a) an input conveyor portion for supporting and advancing a mass of objects in a generally longitudinal direction;

(b) a drive mechanism for driving said input conveyor;

(c) an intermediate multi-track conveyor generally downstream from and connected to the bulk feed conveyor for receiving the objects from the bulk feed conveyor, said multi-track conveyor having guide means mounted orthogonally with respect to said conveyor surface to urge said objects transversely from one conveying track to the next, each conveying track of said multi-track conveyor being driven at a velocity gradient with the fastest conveying track being located the furthest from said guide means;

(d) at least one drive mechanism for driving said intermediate conveyor;

(e) a separation conveyor generally downstream from and connected to the intermediate conveyor for receiving the objects from the intermediate conveyor, said separation conveyor having at least two tracks; each track of said separation conveyor being driven at a velocity gradient with the fastest conveying track being located the furthest from said guide means of said intermediate conveyor thereby achieving a separation of the objects between each track, said tracks each bearing a single file procession of articles;

(f) at least one drive mechanism for driving said separation conveyor;

(g) an output conveyor assembly comprising at least two output channels each connected to a track of the separation conveyor for the linear transfer of articles exiting each track of said separation conveyor;

(h) a drive mechanism for driving each said output channels of said output conveyor assembly;

(i) detection means for detecting the flow of articles in said apparatus including the flow of articles in each said output channels and for generating a signal corresponding to the detected flows;

(j) computer means for receiving the flow signals from said detection means and for processing a response signal selectively directing said drive mechanisms connected respectively to said input, intermediate and output conveyors so as to maintain a substantially even flow of articles in all of said output channels.

The apparatus of the present invention will advantageously be used to obtain, at will, one or two controlled single file delivery streams from a bulk conveyor feed.

BRIEF DESCRIPTION OF THE DRAWINGS

FIG. 4 is a diagrammatic plan view of a conventional arrangement of the pressureless single file combiner of FIG. 3 (prior art).

FIG. 5 is a diagrammatic plan view of a pressureless multilane combiner of the present invention wherein the division is made from a single line flow of articles to two output lanes.

DETAILED DESCRIPTION OF THE PREFERRED EMBODIMENTS

In accordance with a preferred embodiment, the apparatus of the present invention comprises a pressureless multilane combiner intended for conveying a mass input flow of bottles or other similar articles and delivering the bottles in multiple single files for feeding in a packaging unit disposed downstream. One notable imperative in devising such equipment is to minimize damage to the articles being conveyed. Another design imperative is to minimize the size of the equipment to save crucial factory floor space. Yet another design objective is to allow evacuation of bottles which have fallen-over and should therefore not be conveyed to the packaging unit. A fourth objective is to balance the flow between a plurality of lanes of articles being conveyed.

With those imperatives in mind, a preferred embodiment of the invention comprises a two lane pressureless combiner from bulk. In other words, a mass flow of randomly advancing bottles are conveyed to the apparatus of the invention and exit in two single lanes having controlled flows.

It must be understood that although the apparatus of the present invention is ideally suited for use in a bottling plant, other uses are envisaged. For example, the apparatus could be used to convey other articles than bottles, such as plastic or metal containers, or many forms of consumer or industrial goods which require filling, labelling or packaging operations prior to the shipment.

It must also be understood that the apparatus of the present invention can be operated, at will, as a single file output conveyor as will be explained further below.

It must also be understood that the apparatus of the present invention can be combined with a "pressure" type device to funnel articles from bulk into a narrower stream by using curved guide plates, vibration plates, etc.

Figure 1:
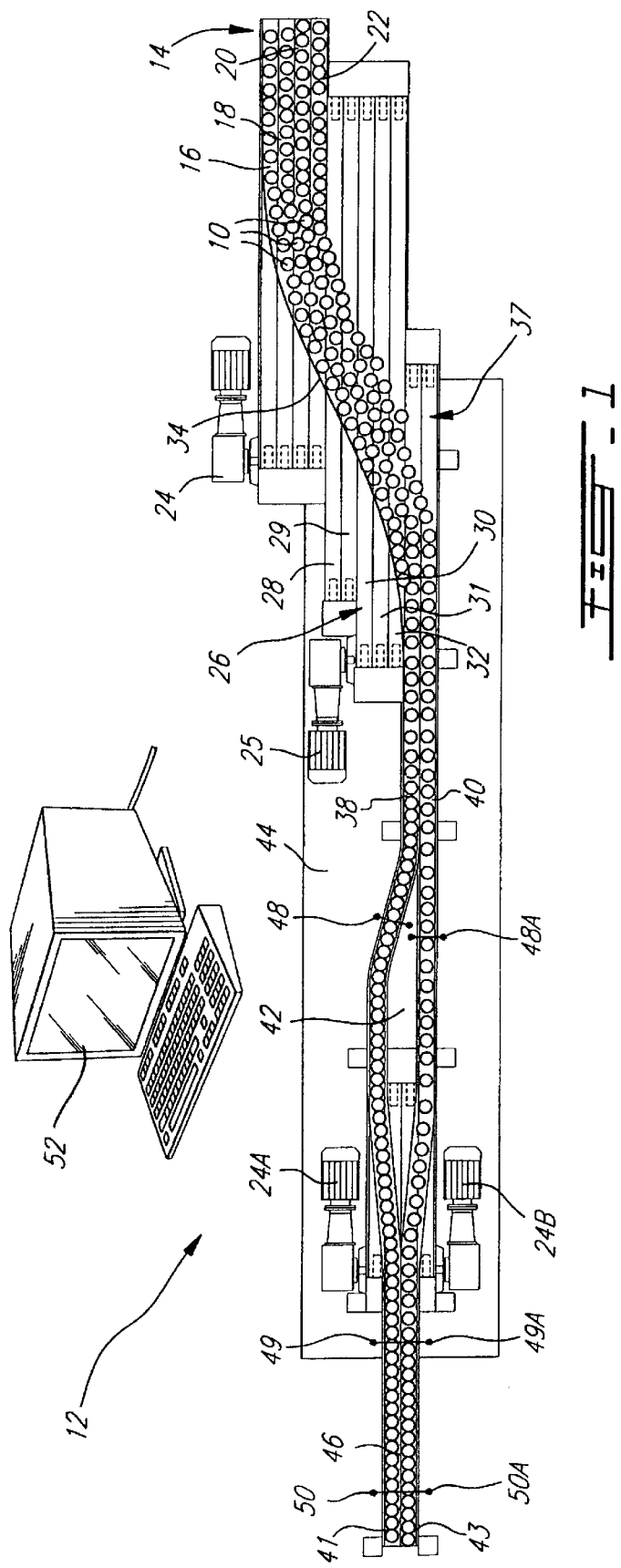
FIG. 1 is a diagrammatic plan view of a pressureless multilane combiner of the present invention wherein the division is made from a bulk flow of articles to two output lanes.

Referring now to the first preferred embodiment for combining a mass flow of bottles in two single files, the apparatus of the present invention will be described in more detail. Referring to FIG. 1, a bulk stream of bottles 10 enter the two lane pressureless combiner generally referred to as numeral 12. The bulk stream of bottles 10 enter combiner 12 from an input bulk conveyor 14 having several tracks 16, 18, 20, and 22 disposed side by side and driven at the same linear velocity. The drive mechanism of course comprises appropriate electrical motors 24 and linkages (not shown).

Bulk conveyor 14 leads to a multi-track intermediate conveyor 26 for accelerating and narrowing and thus separating the stream of bottles 10 received from the bulk conveyor 14.

Figure 3:
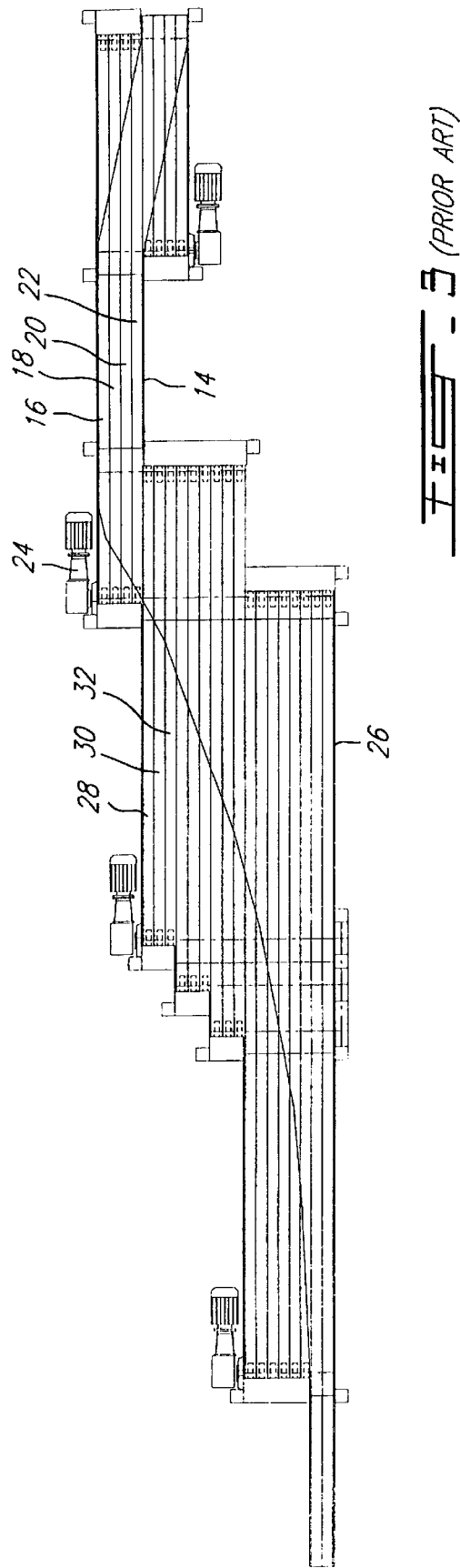
FIG. 3 is a diagrammatic plan view of a conventional (prior art) pressureless single file combiner.

The intermediate conveyor 26 comprises a plurality of parallel and adjacent tracks 28, 29, 30, 31, 32, . . . each driven at a different velocity (velocity gradient) increasing transversely relative to the linear direction of the bottles 10 when received from the bulk conveyor 14. The adjacent tracks 28, 29, 30, 31, 32 are driven by a drive mechanism including an appropriate electrical motor 25 and linkages (not shown). Overlying this intermediate conveyor 26 is a curved guide plate 34 essentially orthogonal to the plane of conveyor 26. The guide plate 34 is adapted to gently push and urge the bottles 10 from low speed tracks to higher speed tracks. Thus, the bottles 10 are gradually accelerated and the width of the stream of bottles 10 delivered to the intermediate conveyor 26 is gradually reduced. So far, this arrangement is conventional and known to those skilled in the art who can calculate and design the velocity gradient of the tracks, the dimensions of the intermediate conveyor 26 and the dimension and shape of guide plate 34 to obtain a single file of bottles 10. Referring to FIG. 3 there is shown a typical prior art version of such single file lane combiner.

Surprisingly, the inventors have invented an improved conveyor which allows multiple single file outputs of articles such as bottles 10. Referring once again to FIG. 1, it is shown how apparatus 12 is designed to provide a separation conveyor 37 downstream from intermediate conveyor 26. The separation conveyor 37 includes two tracks 38 and 40.

To achieve this, a velocity differential is maintained between track 38 and track 40, whereby track 40 is maintained at a higher velocity so as to separate the bottles 10 in two discrete streams. Tracks 38 and 40 are respectively driven by motors 24a and 24b through suitable linkages. To perfect the separation process, bottles 10 which are misaligned on either of tracks 38 or 40 or which have fallen over will be discarded at drop-off zone 42 which comprises a recuperation bin 44 comprises a depression between a borderless split in tracks 38 and 40. Any bottles 10 which as not properly aligned and standing on tracks 38 and 40 will fall into recuperation bin 44. Tracks 38 and 40 are later juxtaposed once again but this time with combining wall 46 in between two avoid any mixing of the two discrete single files. Moreover, tracks 38 and 40 are connected to further conveying output tracks 41 and 43 defining an output conveyor and having their own linear velocity controls. As the bottles 10 reach the end of tracks 38 and 40, bottles 10 will simply transfer onto tracks 41 and 43, respectively.

To monitor the flow of bottles 10 on all tracks, detection devices 48, 48A, 49, 49A and 50, 50A are installed and connected to a computer 52. It is to be understood that the term "computer" is used in a general sense and is meant to encompass any other similar device such as any programmable logic controller or other form of microprocessor or similar device. The detection devices 48, 48A, 49, 49A and 50, 50A can be of the various types commonly available and easily known to those conversant in the art.

Of course computer 52, is designed to maintain even flows of bottles 10 in each track 38 and 40 so that the processing unit located downstream is equally fed in bottles 10. Computer 52 is also designed to permit a gradual ramp-use and shutdown of combiner 12 to avoid causing bottles 10 to fall over or jam as a result of abrupt changes in speed.

Figure 2:
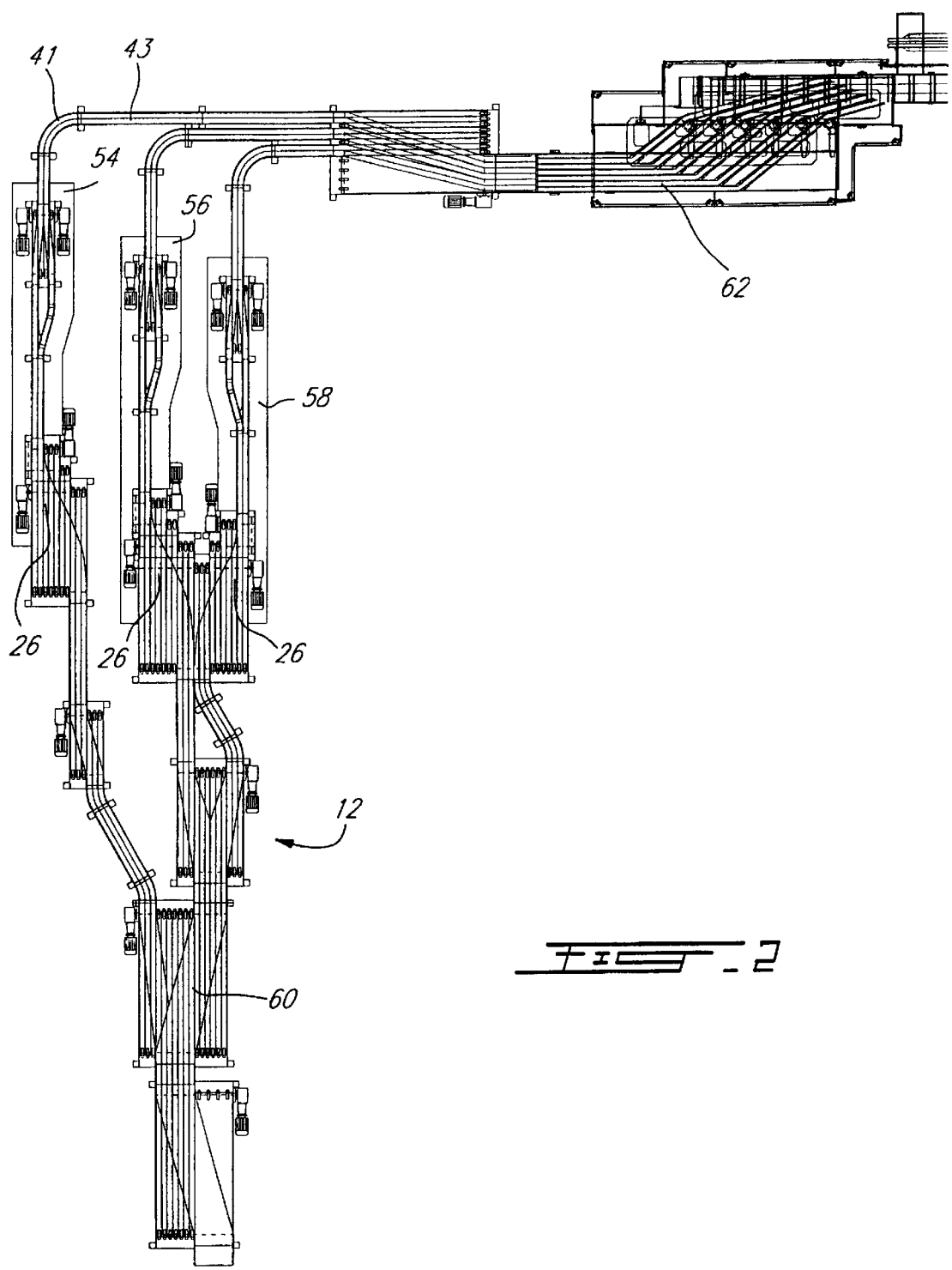
FIG. 2 is a diagrammatic plan view of three pressureless multilane combiners as in FIG. 1 and shown in an arrangement in accordance with a preferred embodiment of the invention.

Referring now to FIG. 2, there is shown a cluster of three similar combiners 54, 56 and 58 substantially as described above with reference to apparatus 12. All three combiners 54, 56 and 58 are connected to a single bulk bottle conveyor 60. Output paths are directed to a downstream packaging machine 62. This arrangement has tremendous advantages over the prior art since it saves valuable space by essentially replacing the need for six single file combiners as taught in the prior art and depicted in FIG. 4. The apparatus of the present invention saves valuable factory floor space and allows more flexibility in installation and operation.

It is to be understood that a similar apparatus could be adapted to provide not just two but up to three or more discrete output flows. Moreover, by stopping output track 40, combiner 12 could essentially function as a single file output conveyor. Thus, the apparatus of the present invention can be switched, at will, from a dual output channel to a single output channel conveyor.

Turning now to FIG. 5, there is illustrated a diagrammatic plan view of a pressureless multilane combiner of the present invention wherein the division is made from a single line flow of articles to two output lanes. Such arrangement would be useful for dividing the flow of single file articles exiting from one apparatus, for example a bottle filling station, into two or more discrete output paths directed to a downstream packaging machine.

What is claimed:

1. A pressureless combiner for management of a bulk input flow of objects traveling on a conveyor line into discrete object channels having a substantially even flow of objects therein, the pressureless combiner being of a type used to feed a machine requiring an orderly and sequential input of objects, the pressureless combiner comprising:

an input conveyor portion for supporting and advancing a mass of objects along a predetermined path of travel;

an intermediate multi-track conveyor generally downstream from and connected to the input conveyor portion for receiving the objects therefrom, said multi-track conveyor comprising a guide member mounted transverse to the conveyor surface to urge the objects transversely from one conveying track to a next, each conveying track of said multi-track conveyor being driven at a velocity gradient with a fastest conveying track being located farthest from said guide member;

a separation conveyor generally downstream from and connected to the intermediate conveyor for receiving the objects therefrom, said separation conveyor comprising at least two tracks, each track of said separation conveyor being driven at a velocity gradient with a fastest conveying track being located farthest from said guide member of said intermediate conveyor thereby achieving a separation of the objects between each track, said tracks each bearing a single file procession of objects;

an output conveyor assembly comprising at least two discrete output channels each connected to a track of said separation conveyor for linear transfer of objects exiting each track of said separation conveyor;

a plurality of detectors for detecting the flow of objects in the apparatus including the flow of objects in each output channel and for generating a signal corresponding to detected flows; and a computer for receiving the flow signals from said plurality of detectors and for controlling said input, intermediate and output conveyors so as to maintain a substantially even flow of objects in all of said output channels.

2. A pressureless combiner according to claim 1, wherein said separation conveyor comprises two tracks.

3. A pressureless combiner according to claim 1, wherein the objects are bottles.

4. A pressureless combiner according to claim 1, further comprising an evacuating device interposed between said separating and output conveyors for evacuating objects in poor alignment along a given conveying track; wherein said evacuating device comprises a drop-off area located on the separation conveyor generally downstream from where the objects have achieved substantial division on each tracks of said separation conveyor; and wherein said drop-off area comprises a borderless portion of each output track so that objects in poor alignment along each output track will tend to fall off the conveying track into a drop-off receptacle.

5. A pressureless combiner according to claim 1, wherein said separation conveyor comprises three tracks, and the output conveyor assembly comprises three output channels.

6. A pressureless combiner according to claim 1, wherein said input conveyor portion comprises a bulk conveyor for advancing a mass and random flow of objects.

7. A pressureless combiner according to claim 1, further comprising two separate drive mechanisms for driving said separation conveyor.

8. A pressureless combiner for management of a flow of objects traveling on a conveyor line into discrete output channels each having a substantially even flow of objects therein, the pressureless combiner being of a type used to feed a machine requiring an orderly and sequential input of objects, the pressureless combiner comprising:

a bulk input conveyor for supporting and advancing a mass and random flow of objects along a predetermined path of travel;

an intermediate multi-track conveyor generally downstream from and connected to the bulk input conveyor for receiving the objects therefrom, said multi-track conveyor comprising a guide member mounted transverse to the conveyor surface to urge the objects transversely from one conveying track to a next, each conveying track of said multi-track conveyor being driven at a velocity gradient with a fastest conveying track being located farthest from said guide member; and a separation conveyor generally downstream from and connected to the intermediate conveyor for receiving the objects therefrom, said separation conveyor comprising at least two tracks, each track of said separation conveyor being driven at a velocity gradient with a fastest conveying track being located farthest from said guide member of said intermediate conveyor thereby achieving a separation of the objects between each track, said tracks each bearing a single file procession of objects;

an output conveyor assembly comprising at least two discrete output channels each connected to a track of said separation conveyor for linear transfer of objects exiting each track of said separation conveyor;

a plurality of detectors for detecting the flow of objects in the apparatus including the flow of objects in each output channel and for generating a signal corresponding to detected flows; and a computer for receiving the flow signals from said plurality of detectors and for controlling said bulk input, intermediate and output conveyors so as to maintain a substantially even flow of objects in all of said output channels.

9. A pressureless combiner according to claim 8, wherein said separation conveyor comprises two tracks.

10. A pressureless combiner according to claim 8, wherein the objects are bottles.

11. A pressureless combiner according to claim 8, further comprising an evacuating device interposed between said separating and output conveyors for evacuating objects in poor alignment along a given conveying track; wherein said evacuating device comprises a drop-off area located on the separation conveyor generally downstream from where the objects have achieved substantial division on each tracks of said separation conveyor; and wherein said drop-off area comprises a borderless portion of each output track so that objects in poor alignment along each output track will tend to fall off the conveying track into a drop-off receptacle.

12. A pressureless combiner according to claim 8, wherein the separation conveyor comprises three tracks, and the output conveyor assembly comprises three output channels.

13. A pressureless combiner according to claim 8, further comprising two separate drive mechanisms for driving said separation conveyor.

14. A pressureless combiner for management of a bulk input flow of objects traveling on a conveyor line into discrete output channels having a substantially even flow of objects therein, the pressureless combiner being of a type used to feed a machine requiring an orderly and sequential input of the objects, the pressureless combiner comprising:

(a) an input conveyor portion for supporting and advancing a mass of objects in a generally longitudinal direction;

(b) a drive mechanism for driving said input conveyor portion;

(c) an intermediate multi-track conveyor generally downstream from and connected to the input conveyor portion for receiving the objects therefrom, said multi-track conveyor comprising guide means mounted transverse to the conveyor surface to urge the objects transversely from one conveying track to a next, each conveying track of said multi-track conveyor being driven at a velocity gradient with a fastest conveying track being located farthest from said guide means;

(d) at least one drive mechanism for driving said intermediate conveyor;

(e) a separation conveyor generally downstream from and connected to the intermediate conveyor for receiving the objects therefrom, said separation conveyor comprising at least two tracks, each track of said separation conveyor being driven at a velocity gradient with a fastest conveying track being located farthest from said guide means of said intermediate conveyor thereby achieving a separation of the objects between each track, said tracks each bearing a single file procession of the objects;

(f) at least one drive mechanism for driving said separation conveyor;

(g) an output conveyor assembly comprising at least two discrete output channels each connected to a track of said separation conveyor for linear transfer of the objects exiting each track of said separation conveyor;

(h) a drive mechanism for driving each output channel of said output conveyor assembly;

(i) a plurality of detectors for detecting the flow of objects in the apparatus including the flow of objects in each output channel and for generating a signal corresponding to detected flows; and (j) a computer for receiving the flow signals from said plurality of detectors and for processing a response signal selectively directing said drive mechanisms connected respectively to said input, intermediate and output conveyors so as to maintain a substantially even flow of objects in all of said output channels.

15. A pressureless combiner according to claim 14, wherein said separation conveyor comprises two tracks.

16. A pressureless combiner according to claim 14, wherein the objects are bottles.

17. A pressureless combiner according to claim 14, further comprising evacuating means interposed between said separating and output conveyors for evacuating objects in poor alignment along a given conveying track; wherein said evacuating means comprises a drop-off area located on the separation conveyor generally downstream from where the objects have achieved substantial division on each tracks of said separation conveyor; and wherein said drop-off area comprises a borderless portion of each output track so that objects in poor alignment along each output track will tend to fall off the conveying track into a drop-off receptacle.

18. A pressureless combiner according to claim 14, wherein said separation conveyor comprises three tracks, and the output conveyor assembly comprises three output channels.

19. A pressureless combiner according to claim 14, wherein said input conveyor portion comprises a bulk conveyor for advancing a mass and random flow of objects.

20. A pressureless combiner according to claim 14, wherein said at least one drive mechanism comprises two separate drive mechanisms for driving said separation conveyor.

* * * * *

UNITED STATES PATENT AND TRADEMARK OFFICE
CERTIFICATE OF CORRECTION

PATENT NO. : 6,206,174 B1
DATED : March 27, 2001
INVENTOR(S) : Frank Koltz

It is certified that error appears in the above-identified patent and that said Letters Patent is hereby corrected as shown below:

Title page,
Add in line [73]: Gebo Conveyors, Consultants, & Systems, Inc., Quebec Canada Signed and Sealed this Ninth Day of October, 2001

Attest:

NICHOLAS P. GODICI
Attesting Officer
Acting Director of the United States Patent and Trademark Office